ROBERT HUNTER, OF NEW YORK, N. Y.

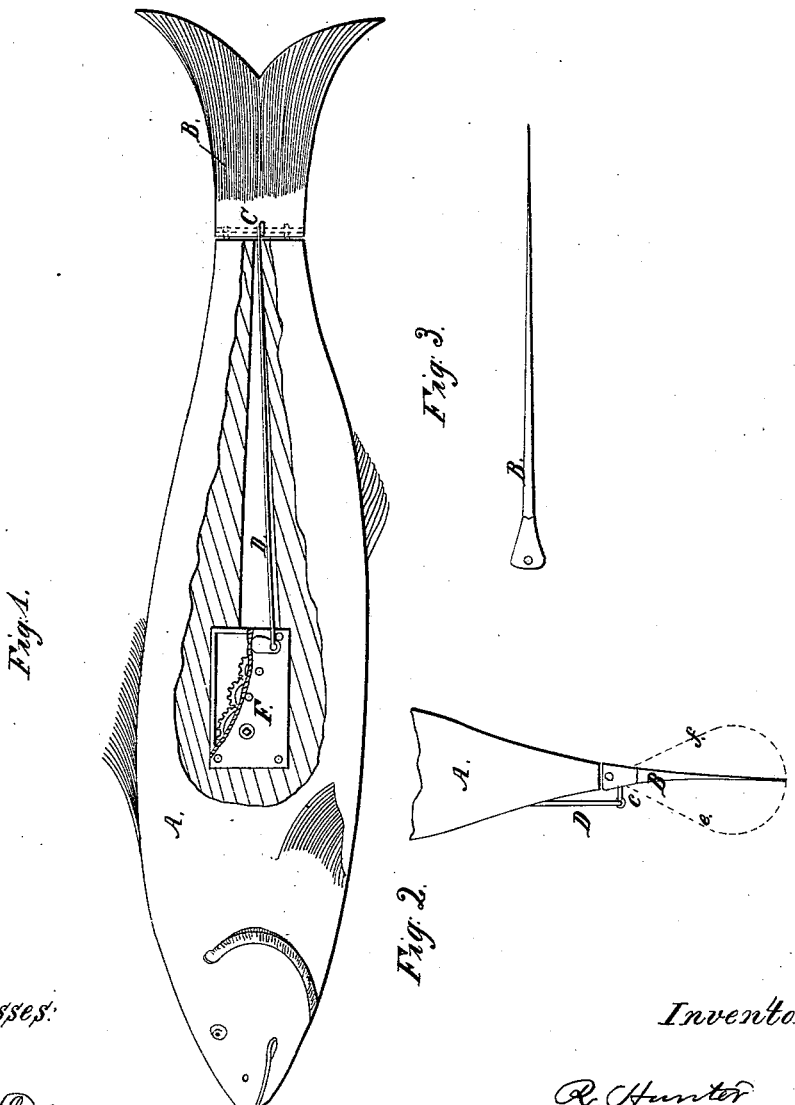

*Letters Patent No. 84,628, dated December 1, 1868.*

TOY-FISH.

The Schedule referred to in these Letters Patent and making part of the same.

Be it known that I, ROBERT HUNTER, of 9 Brevoort Place, in the city of New York, doctor of medicine, have invented a Propeller for Toys, intended more particularly for mechanical fish, but also applicable to toy-boats; and I hereby declare that the following is a true and exact description thereof, reference being had to the accompanying drawing.

The peculiarity of this invention consists in a vibrating tail, made of thin elastic material, and operated by a coil-spring and ordinary gearing.

The tail may be made of steel, whalebone, or other suitable material, and should be rigidly attached to the rudder-post of a toy-boat, or at the point of junction of the tail to the body of a toy-fish. This post may be made to revolve in journals at each end, or be hinged by wire loops.

From this post a short arm or lever projects laterally, to which the shaft is connected by a movable joint. This shaft is operated by a crank and ordinary spring-work within the body of the fish or toy-boat.

Figure I represents the sides of a toy-fish with the propelling-tail adjusted.

A is the body of the fish;
B, the hinged tail;
C, the short arm or lever;
D, the shaft;
E, the crank; and
F, the spring and cog-wheel gearing.

Figure II shows a vertical view of the fish with the tail adjusted.

It will be seen that when the crank turns, it projects the shaft out, and draws it in with each revolution.

This shaft being connected with the short arm or lever, causes the flexible tail to move laterally, and to bend in the manner indicated by the dotted lines *e* and *f*. This gives the fish the appearance of life when placed in water, and causes it to swim with precisely the motions of the natural fish.

Figure III represents the best form in which the tail is made, tapering gradually from the point of junction with the body of the fish down to a fine filmy edge. This causes it to bend chiefly at the extreme end, and gives greater propulsion from each stroke.

The same mode of construction applies to toy-boats, on which it is proposed to use it as a propeller.

What I claim as new, and desire to secure by Letters Patent, is as follows:

The application of the vibrating tail as a propeller for mechanical fish, toy-boats, &c., substantially as and for the purpose stated.

New York, October 24, 1868.

ROBERT HUNTER.

Witnesses:
   OCTAVIUS KNIGHT,
   WM. H. BRERETON, Jr.